(12) United States Patent
Amin et al.

(10) Patent No.: US 8,229,863 B2
(45) Date of Patent: Jul. 24, 2012

(54) METHOD AND APPARATUS FOR EVOLVING A QUANTUM SYSTEM USING A MIXED INITIAL HAMILTONIAN COMPRISING BOTH DIAGONAL AND OFF-DIAGONAL TERMS

(75) Inventors: Mohammad Amin, Vancouver (CA); Vicky Choi, Blacksburg, VA (US); Andrew J. Berkley, Vancouver (CA)

(73) Assignee: D-Wave Systems Inc., Burnaby (CA)

( * ) Notice: Subject to any disclaimer, the term of this patent is extended or adjusted under 35 U.S.C. 154(b) by 625 days.

(21) Appl. No.: 12/473,970

(22) Filed: May 28, 2009

(65) Prior Publication Data
US 2009/0299947 A1 Dec. 3, 2009

Related U.S. Application Data

(60) Provisional application No. 61/056,781, filed on May 28, 2008, provisional application No. 61/092,665, filed on Aug. 28, 2008.

(51) Int. Cl.
*G06E 1/00* (2006.01)
(52) U.S. Cl. ........................................................ 706/10
(58) Field of Classification Search .................... 706/10, 706/14, 46, 52; 977/933
See application file for complete search history.

(56) References Cited

U.S. PATENT DOCUMENTS

| | | | | |
|---|---|---|---|---|
| 5,917,322 A * | 6/1999 | Gershenfeld et al. | ......... | 324/307 |
| 7,135,701 B2 | 11/2006 | Amin et al. | ..................... | 257/31 |
| 2001/0032694 A1 * | 10/2001 | Ishiyama | .................... | 156/110.1 |
| 2004/0165454 A1 * | 8/2004 | Amin et al. | ..................... | 365/200 |
| 2004/0173787 A1 * | 9/2004 | Blais et al. | ........................ | 257/10 |
| 2004/0173793 A1 * | 9/2004 | Blais et al. | ........................ | 257/31 |
| 2005/0137959 A1 * | 6/2005 | Yan et al. | ......................... | 705/37 |
| 2006/0225165 A1 | 10/2006 | Maassen van den Brink et al. | ............................ | 977/933 |
| 2008/0162613 A1 | 7/2008 | Amin | ................................. | 708/2 |
| 2008/0176750 A1 | 7/2008 | Rose et al. | ....................... | 505/170 |
| 2008/0215850 A1 | 9/2008 | Berkley et al. | .................... | 712/1 |
| 2009/0082209 A1 | 3/2009 | Bunyk et al. | .................. | 505/190 |
| 2009/0121215 A1 | 5/2009 | Choi | ............................... | 257/31 |

FOREIGN PATENT DOCUMENTS

WO PCT/US2009/37984 3/2009
(Continued)

OTHER PUBLICATIONS

U.S. Appl. No. 61/058,494, filed Jun. 3, 2008, Maibaum et al.

(Continued)

*Primary Examiner* — David Vincent
(74) *Attorney, Agent, or Firm* — Seed IP Law Group PLLC

(57) ABSTRACT

Various adaptations to adiabatic quantum computation and quantum annealing are described. These adaptations generally involve tailoring an initial Hamiltonian so that a local minimum is avoided when a quantum processor is evolved from the initial Hamiltonian to a problem Hamiltonian. The initial Hamiltonian may represent a mixed Hamiltonian that includes both diagonal and off-diagonal terms, where the diagonal terms at least partially define a center point of a first computation space that is at least partially contained within a second computation space. A problem Hamiltonian may be evolved into a low energy state by inhomogeneously inducing disorder in the qubits of the quantum processor. A higher degree of disorder may be induced in a subset of qubits predicted to contribute to a local minimum of the problem Hamiltonian.

15 Claims, 10 Drawing Sheets

FOREIGN PATENT DOCUMENTS

| WO | PCT/US2009/44537 | 5/2009 |
|---|---|---|
| WO | PCT/US2009/45976 | 6/2009 |

OTHER PUBLICATIONS

U.S. Appl. No. 61/092,665, filed Aug. 28, 2008, Amin et al.
U.S. Appl. No. 12/109,847, filed Apr. 25, 2008, Berkley.
Amin et al., "Thermally Assisted Adiabatic Quantum Computation," *Physical Review Letters* 100(060503):1-4, 2008.
Amin, M.H.S., "Effect of Local Minima on Adiabatic Quantum Optimization," *Physical Review Letters* 100(130503):1-4, 2008.
Farhi et al., "Quantum Adiabatic Evolution Algorithms with Different Paths," arXiv:quant-ph/0208135v1, pp. 1-10, 2002.
Graham et al., "On the Covering Radius of Codes," *IEEE Transactions on Information Theory IT-31*(3):385-401, 1985.
Roland et al., "Quantum Search by Local Adiabatic Evolution," *Physical Review A.* 65(042308):1-6, 2002.
Sarandy et al., "Adiabatic Quantum Computation in Open Systems," *Physical Review Letters* 95(250503):1-4, 2005.

\* cited by examiner

METHOD AND APPARATUS FOR EVOLVING A QUANTUM SYSTEM USING A MIXED INITIAL HAMILTONIAN COMPRISING BOTH DIAGONAL AND OFF-DIAGONAL TERMS

CROSS REFERENCE TO RELATED APPLICATIONS

This application claims benefit under 35 U.S.C. 119(e) of U.S. Provisional Patent Application Ser. No. 61/056,781, filed May 28, 2008 and entitled "Systems, Methods and Apparatus for Adiabatic Quantum Computation," and U.S. Provisional Patent Application Ser. No. 61/092,665, filed Aug. 28, 2008 and entitled "Systems, Methods and Apparatus to Avoid Local Minima in Quantum Computation," both of which are incorporated herein by reference in their entirety.

BACKGROUND

Field

This disclosure generally relates to adiabatic quantum computation and quantum annealing and particularly relates to methods of adiabatic quantum computation and quantum annealing using a superconducting quantum processor.

Superconducting Qubits

There are many different hardware and software approaches under consideration for use in quantum computers. One hardware approach employs integrated circuits formed of superconducting material, such as aluminum and/or niobium, to define superconducting qubits. Superconducting qubits can be separated into several categories depending on the physical property used to encode information. For example, they may be separated into charge, flux and phase devices. Charge devices store and manipulate information in the charge states of the device; flux devices store and manipulate information in a variable related to the magnetic flux through some part of the device; and phase devices store and manipulate information in a variable related to the difference in superconducting phase between two regions of the phase device.

Many different forms of superconducting flux qubits have been implemented in the art, but all successful implementations generally include a superconducting loop (i.e., a "qubit loop") that is interrupted by at least one Josephson junction. Some embodiments implement multiple Josephson junctions connected either in series or in parallel (i.e., a compound Josephson junction) and some embodiments implement multiple superconducting loops.

Quantum Processor

A computer processor may take the form of an analog processor, for instance a quantum processor such as a superconducting quantum processor. A superconducting quantum processor may include a number of qubits and associated local bias devices, for instance two or more superconducting qubits. Further detail and embodiments of exemplary quantum processors that may be used in conjunction with the present systems, methods, and apparatus are described in US Patent Publication No. 2006-0225165, US Patent Publication 2008-0176750, U.S. patent application Ser. No. 12/266,378, and PCT Patent Application Serial No. PCT/US09/37984.

Adiabatic Quantum Computation

Adiabatic quantum computation typically involves evolving a system from a known initial Hamiltonian (the Hamiltonian being an operator whose eigenvalues are the allowed energies of the system) to a final Hamiltonian by gradually changing the Hamiltonian. A simple example of an adiabatic evolution is:

$$H_e = (1-s)H_{in} + sH_f$$

where $H_{in}$ is the initial Hamiltonian, $H_f$ is the final Hamiltonian, $H_e$ is the evolution or instantaneous Hamiltonian, and s is an evolution coefficient which controls the rate of evolution. As the system evolves, the coefficient s goes from 0 to 1 such that at the beginning (i.e., s=0) the evolution Hamiltonian $H_e$ is equal to the initial Hamiltonian $H_{in}$ and at the end (i.e., s=1) the evolution Hamiltonian $H_e$ is equal to the final Hamiltonian $H_f$. Before the evolution begins, the system is typically initialized in a ground state of the initial Hamiltonian $H_{in}$ and the goal is to evolve the system in such a way that the system ends up in a ground state of the final Hamiltonian $H_f$ at the end of the evolution. If the evolution is too fast, then the system can be excited to a higher energy state, such as the first excited state. In the present systems, methods, and apparatus, an "adiabatic" evolution is considered to be an evolution that satisfies the adiabatic condition:

$$\dot{s}|\langle 1|dH_e/ds|0\rangle| = \delta g^2(s)$$

where $\dot{s}$ is the time derivative of s, g(s) is the difference in energy between the ground state and first excited state of the system (also referred to herein as the "gap size") as a function of s, and $\delta$ is a coefficient much less than 1.

The evolution process in adiabatic quantum computing may sometimes be referred to as annealing. The evolution of s, sometimes referred to as an evolution or annealing schedule, is normally slow enough that the system is always in the instantaneous ground state of the evolution Hamiltonian during the evolution, and transitions at anti-crossings (i.e., when the gap size is smallest) are avoided. Further details on adiabatic quantum computing systems, methods, and apparatus are described in U.S. Pat. No. 7,135,701.

Although adiabatic quantum computation is thought to be faster at solving some computational problems than classical computers, the speed is limited by the fact that the quantum system must be evolved slowly enough to avoid excitations out of the ground state. Farhi et al., 2002, arXiv.org:quant-ph/0208135 propose using faster non-linear evolution schedules. Sarandy et al., *Physical Review Letters* 95, 250503 analyze situations where the adiabaticity of the evolution breaks down and suggest speeding up the evolution and performing it many times. Roland et al., 2002, *Physical Review A* 65, 042308 describe a method of slowing down the adiabatic evolution at known points where an anti-crossing occurs, where the slow-down is proportional to the gap size of the anti-crossing. At points far away from anti-crossings, the evolution can be sped up. However, this technique is still unsatisfactory because it is difficult to determine the exact point where an anti-crossing occurs during the adiabatic evolution and its corresponding gap size. As a consequence, for an arbitrary evolution Hamiltonian, this technique is not effective.

Another approach to adiabatic quantum computation, known as "Thermally Assisted Adiabatic Quantum Computation", is described in Amin, M.H.S. et al., "Thermally assisted adiabatic quantum computation," PRL 100, 060503 (2008), pp 1-4. In this approach, anti-crossings may be passed non-adiabatically because transitions at anti-crossings are actually desired. The system is excited from the ground state to an excited state just before an anti-crossing, so that non-adiabatically passing the anti-crossing may result in a transition from the excited state back to the ground state. This technique forms at least part of the subject of US Patent Publication 2008-0162613.

Many methods for improving the speed of adiabatic quantum computation have been proposed; however, all of these methods focus on tailoring the evolution of the system to reduce the likelihood of being trapped in a local minimum. The present systems, methods and apparatus may provide improved techniques for adiabatic quantum computation that focus on tailoring the initial Hamiltonian so that evolving to the final Hamiltonian avoids local minima.

Quantum Annealing

Quantum annealing is a computation method that may be used to find a low-energy state, typically preferably the ground state, of a system. Similar in concept to classical annealing, the method relies on the underlying principle that natural systems tend towards lower energy states because lower energy states are more stable. However, while classical annealing uses classical thermal fluctuations to guide a system to its global energy minimum, quantum annealing may use quantum effects, such as quantum tunneling, to reach a global energy minimum more accurately and/or more quickly. It is known that the solution to a hard problem, such as a combinatorial optimization problem, may be encoded in the ground state of a system Hamiltonian and therefore quantum annealing may be used to find the solution to such hard problems. Adiabatic quantum computation is a special case of quantum annealing for which the system, ideally, begins and remains in its ground state throughout an adiabatic evolution. Thus, those of skill in the art will appreciate that quantum annealing systems and methods may generally be implemented on an adiabatic quantum computer, and vice versa. Throughout this specification and the appended claims, any reference to adiabatic quantum computation is intended to encompass quantum annealing in general unless the context requires otherwise.

Quantum annealing is an algorithm that uses quantum mechanics as a source of disorder during the annealing process. The optimization problem is encoded in a Hamiltonian $H_P$, and the algorithm introduces strong quantum fluctuations by adding a disordering Hamiltonian $H_D$ that does not commute with $H_P$. An example case is:

$$H_E = H_P + \Gamma H_D,$$

where $\Gamma$ changes from a large value to substantially zero during the evolution and $H_E$ may be thought of as an evolution Hamiltonian similar to $H_e$ described in the context of adiabatic quantum computation above. The disorder is slowly removed by removing $H_D$ (i.e., reducing $\Gamma$). Thus, quantum annealing is similar to adiabatic quantum computation in that the system starts with an initial Hamiltonian and evolves through an evolution Hamiltonian to a final "problem" Hamiltonian $H_P$ whose ground state encodes a solution to the problem. If the evolution is slow enough, the system will typically settle in a minimum close to the exact solution; the slower the evolution, the better the solution that will be achieved. The performance of the computation may be assessed via the residual energy (distance from exact solution using the objective function) versus evolution time. The computation time is the time required to generate a residual energy below some acceptable threshold value. In quantum annealing, $H_P$ may encode an optimization problem and therefore $H_P$ may be diagonal in the subspace of the qubits that encode the solution, but the system does not necessarily stay in the ground state at all times. The energy landscape of $H_P$ may be crafted so that its global minimum is the answer to the problem to be solved, and low-lying local minima are good approximations.

The gradual reduction of $\Gamma$ in quantum annealing may follow a defined schedule known as an annealing schedule. Unlike traditional forms of adiabatic quantum computation where the system begins and remains in its ground state throughout the evolution, in quantum annealing the system may not remain in its ground state throughout the entire annealing schedule. As such, quantum annealing may be implemented as a heuristic technique, where low-energy states with energy near that of the ground state may provide approximate solutions to the problem.

BRIEF SUMMARY

At least one embodiment may be summarized as a method of solving a problem by evolving a quantum processor from a first configuration that represents an initial Hamiltonian including off-diagonal terms to a second configuration that represents a problem Hamiltonian including diagonal terms, the method including configuring the problem Hamiltonian to encode the problem; pre-processing the problem Hamiltonian by a processor system; configuring the initial Hamiltonian based on a result of pre-processing the problem Hamiltonian such that a state of a quantum processor avoids a local minimum during an evolution from the initial Hamiltonian to the problem Hamiltonian; initializing the quantum processor in the first configuration, wherein the first configuration represents the initial Hamiltonian; evolving the quantum processor to the second configuration, wherein the second configuration represents the problem Hamiltonian, and wherein a state of the quantum processor avoids a local minimum during the evolution; and reading out the state of the quantum processor. Pre-processing the problem Hamiltonian may include pre-processing the problem Hamiltonian using a classical digital computer. In some embodiments, configuring the initial Hamiltonian may include adapting the initial Hamiltonian to include off-diagonal and diagonal terms. The diagonal terms may at least partially define a center point of a first computation space that is at least partially contained within a second computation space, where the second computation space is larger than the first computation space and the state of the quantum processor remains within the first computation space throughout the evolution. The method may include repeating the initializing the quantum processor, evolving the quantum processor, and reading out the state of the quantum processor in a plurality of iterations, where at least one iteration may involve initializing the quantum processor with a center point that is different from a center point in at least one other iteration. Each iteration may include evolving within a unique first computation space, thereby defining a set of first computation spaces, where the set of first computation spaces may cover the second computation space.

In some embodiments, the configuring the initial Hamiltonian may include adapting the initial Hamiltonian to include inhomogeneous off-diagonal terms. The quantum processor may include a plurality of qubits and the inhomogeneous off-diagonal terms may be realized by applying a respective disordering signal to each qubit, where each disordering signal induces a quantum tunneling in the respective qubit to which the disordering signal is applied. The problem Hamiltonian may be at least partially defined by a configuration of inter-couplings between the qubits in the plurality of qubits, and the method may include applying a respective total coupling value to each qubit in the plurality of qubits. Applying a respective disordering signal to each qubit in the plurality of qubits may include applying a respective disordering signal that is dependent on the respective total coupling value applied to each qubit.

At least one embodiment may be summarized as a method of quantum computing using a quantum system comprising a plurality of qubits, the method including initializing the quantum system in a first configuration, wherein the first configuration represents a mixed initial Hamiltonian that includes both diagonal and off-diagonal terms, and wherein the diagonal terms at least partially define a center point of a first computation space that is at least partially contained within a second computation space, wherein the second computation space is larger than the first computation space; evolving the quantum system to a second configuration, wherein the second configuration represents a final Hamiltonian that includes diagonal terms, and wherein a state of the quantum system remains within the first computation space throughout the evolution; and reading out the state of the quantum system. Initializing the quantum system in a first configuration may include initializing the quantum system in a ground state of the mixed initial Hamiltonian. Evolving the quantum system may include evolving the quantum system such that at least a portion of the evolution is adiabatically evolved thereby achieving an adiabatic evolution. Evolving the quantum system may include evolving the quantum system such that the quantum system remains in a ground state throughout the evolution and the state of the quantum system that is read out is a ground state of the final Hamiltonian. The final Hamiltonian may encode a solution to a problem. Initializing the quantum system may include programming the diagonal terms of the mixed initial Hamiltonian by assigning an initial value to each qubit. In some embodiments, the method may include repeating the initializing the quantum system, evolving the quantum system, and reading out the state of the quantum system in a plurality of iterations, where at least one iteration may involve initializing the quantum system with a center point that is different from a center point in at least one other iteration. Each iteration may include evolving within a unique first computation space, thereby defining a set of first computation spaces, where the set of first computation spaces may cover the second computation space. In some embodiments, the method may include preprocessing at least a portion of the second computation space to generate the set of first computation spaces such that the set of first computation spaces covers the second computation space. The preprocessing may include generating the set of first computation spaces via at least one of: a covering code technique, a vertex coloring technique, and establishing a random set of center points.

At least one embodiment may be summarized as a processor system including a superconducting quantum processor comprising a plurality of qubits and at least one coupler between at least some respective pairs of qubits; an operational subsystem including a plurality of programming interfaces operable to program the qubits, the operational subsystem configured to initialize the superconducting quantum processor in a first configuration, wherein the first configuration describes a mixed initial Hamiltonian that includes both diagonal and off-diagonal terms, and wherein the diagonal terms at least partially define a center point of a first computation space that is at least partially contained within a second computation space, wherein the second computation space is larger than the first computation space; and a read out subsystem configured to read out a state of the superconducting quantum processor after an evolution of the superconducting quantum processor to a second configuration, wherein the second configuration is described by a final Hamiltonian that includes diagonal, and wherein the state of the superconducting quantum processor remains within the first computation space throughout the evolution. The operational subsystem may be further configured to iteratively repeatedly initialize the superconducting quantum processor with a unique center point during each iteration. The read out subsystem may be further configured to read out a respective state of the superconducting quantum processor during each iteration.

At least one embodiment may be summarized as a computer-implemented method including computationally determining from a set of qubits comprising a quantum processor a subset of qubits that are predicted to contribute a local minimum to a problem Hamiltonian, wherein the subset of qubits includes at least one qubit; inhomogeneously inducing disorder in the set of qubits such that a higher degree of disorder is induced in each qubit in the subset of qubits than to the other qubits in the set of qubits; evolving the quantum processor by gradually removing the disorder; and measuring a state of at least one qubit from the set of qubits. Inhomogeneously inducing disorder in the set of qubits may include applying a respective disordering signal to each qubit, where each disordering signal induces a quantum tunneling in the respective qubit to which the disordering signal is applied. In some embodiments, the problem Hamiltonian may be at least partially defined by a configuration of inter-couplings between the qubits in the set of qubits, and the method may include applying a respective total coupling value to each qubit in the set of qubits. Applying a respective disordering signal to each qubit in the set of qubits may include applying a respective disordering signal that is dependent on the respective total coupling value applied to each qubit. The subset of qubits may include a group of strongly inter-coupled qubits, and applying a respective total coupling value to each qubit in the set of qubits may include applying a respective total coupling value to each qubit in the subset of qubits that is higher than an average total coupling value applied to the other qubits in the set of qubits. Computationally determining a subset of qubits from the set of qubits that are predicted to contribute a local minimum to the problem Hamiltonian may include computationally determining the subset of qubits using a digital processor.

At least one embodiment may be summarized as a processor system including a superconducting quantum processor comprising a plurality of qubits and at least one coupler between at least some respective pairs of qubits; an operational subsystem including a plurality of programming interfaces operable to program the qubits, the operational subsystem configured to inhomogeneously induce disorder in the plurality of qubits; and a read out subsystem configured to read out a state of the superconducting quantum processor after an evolution of the superconducting quantum processor. The operational subsystem may be further configured to apply a respective disordering signal to each qubit, where each disordering signal induces a quantum tunneling in the respective qubit to which the disordering signal is applied. The operational subsystem may be further configured to apply a respective total coupling value to each qubit in the set of qubits, where the disordering signal that is applied to each qubit is dependent on the respective total coupling value applied to that qubit.

BRIEF DESCRIPTION OF THE SEVERAL VIEWS OF THE DRAWING(S)

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

DETAILED DESCRIPTION OF THE INVENTION

Figure 1:
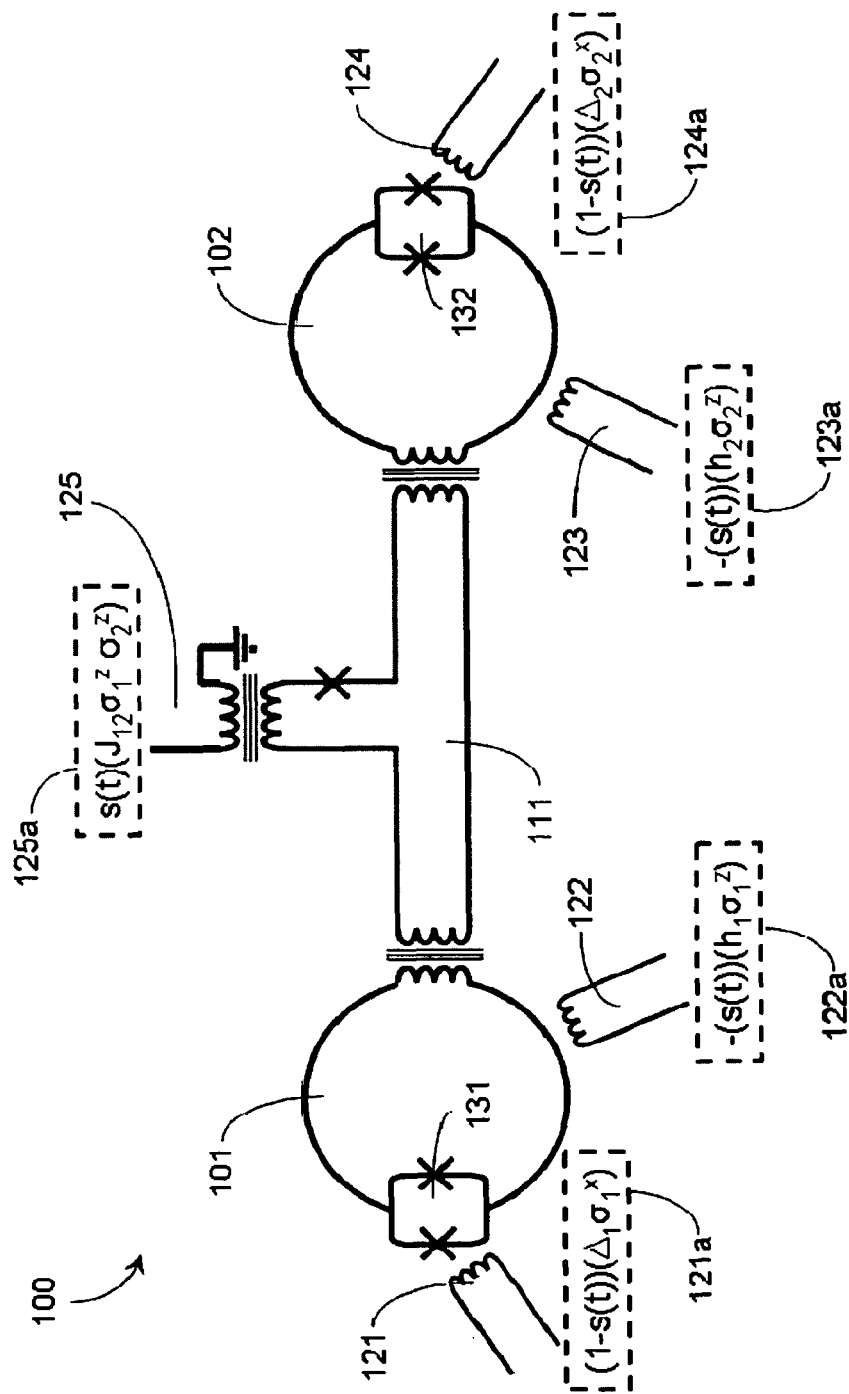
FIG. 1 is a schematic diagram of a portion of a conventional superconducting quantum processor designed for adiabatic quantum computation.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with analog processors, such as quantum processors, quantum devices, coupling devices and control systems including microprocessors and drive circuitry have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

The present systems, methods and apparatus generally provide techniques that may improve adiabatic quantum computation and/or quantum annealing by configuring an initial Hamiltonian such that at least one local minimum is avoided when a quantum processor is evolved from the initial Hamiltonian to a problem Hamiltonian. For example, various embodiments described herein provide techniques for potentially decreasing the computation time of some algorithms for adiabatic quantum computation and/or quantum annealing. As previously discussed, the computation time of such algorithms is known to generally depend, at least in part, on the size of the minimum gap of an anti-crossing. In Amin, M.H.S., "Effect of local minima on quantum adiabatic optimization", PRL 100, 130503 (2008), it is shown that the size of the minimum gap is inversely proportional to the square root of the number of states that have energies close to the global minimum (i.e. energies below some threshold). It follows that problems that have a large number of low energy local minima tend to have a small minimum gap, and therefore a long computation time.

Some embodiments of the present systems, methods and apparatus describe techniques for effectively reducing the range of influence of the low energy local minima in adiabatic quantum computation. This approach is inspired by the concept of a "covering" and has the benefit of increasing the size of the minimum gap during the computation process, thereby reducing the necessary computation time.

A larger space is said to be "covered" by a set of smaller spaces if every point in the larger space is included in at least one smaller space from the set of smaller spaces. A "covering" may then generally be defined as a set of smaller spaces that covers a larger space. Each smaller space in the set of smaller spaces may be referred to as a "ball", which is a term that is similarly used in the known art. For example, the space defined by the set of integers from 1 to 100 may be covered by a set of five balls, where the space defined by each ball has a radius of ten integers and the balls are respectively centered at 10, 30, 50, 70, and 90. Those of skill in the art will appreciate that the term "ball" is not used herein to indicate a specific geometric shape, but rather denotes a computational subspace. The concept of a covering has many applications, both in theory and in practice. In accordance with some embodiments of the present systems, methods and apparatus, the concept of a covering is incorporated into methods of adiabatic quantum computation.

As previously discussed, a typical adiabatic evolution may be represented by equation 1:

$$H_e = (1-s)H_{In} + sH_f \qquad (1)$$

where $H_{In}$ is the initial Hamiltonian, $H_f$ is the final or "problem" Hamiltonian, $H_e$ is the evolution or instantaneous Hamiltonian, and s is the evolution coefficient which controls the rate of evolution. In general, s may vary from 0 to 1 with time t as s(t). Various embodiments described herein provide techniques which may advantageously reduce this time, t, compared to most known approaches of adiabatic quantum computation (AQC).

A common approach to AQC, described, for example, in Amin, M.H.S., "Effect of local minima on quantum adiabatic optimization", PRL 100, 130503 (2008), is to start with an initial Hamiltonian of the form shown in equation 2:

$$H_{In} = -\frac{1}{2}\sum_{i=1}^{n}\Delta_i\sigma_i^x \qquad (2)$$

where n represents the number of qubits, $\sigma_i^x$ is the Pauli x-matrix for the $i^{th}$ qubit and $\Delta_i$ is the single qubit tunnel splitting induced in the $i^{th}$ qubit. Here, the $\sigma_i^x$ terms are examples of "off-diagonal" terms. An initial Hamiltonian of this form may, for example, be evolved to a final Hamiltonian of the form:

$$H_f = -\frac{\varepsilon}{2}\left[\sum_{i=1}^{n}h_i\sigma_i^z + \sum_{i,j=1}^{n}J_{ij}\sigma_i^z\sigma_j^z\right] \qquad (3)$$

where n represents the number of qubits, $\sigma_i^z$ is the Pauli z-matrix for the $i^{th}$ qubit, $h_i$ and $J_{i,j}$ are dimensionless local fields coupled into each qubit, and is some characteristic energy scale for $H_f$. Here, the $\sigma_i^z$ and $\sigma_i^z\sigma_j^z$ terms are examples of "diagonal" terms. Throughout this specification and the appended claims, the terms "final Hamiltonian" and "problem Hamiltonian" are used interchangeably. Hamiltonians such as $H_{in}$ and $H_f$ in equations 2 and 3, respectively, may be physically realized in a variety of different ways. A particular example is realized by an implementation of superconducting qubits.

FIG. 1 is a schematic diagram of a portion of a superconducting quantum processor 100 designed for AQC (and/or quantum annealing). The portion of superconducting quantum processor 100 shown in FIG. 1 includes two superconducting qubits 101, 102 and a tunable ZZ-coupler 111 coupling information therebetween. While the portion of quantum processor 100 shown in FIG. 1 includes only two qubits 101, 102 and one coupler 111, those of skill in the art will appreciate that quantum processor 100 may include any number of qubits and any number of coupling devices coupling information therebetween.

The portion of quantum processor 100 shown in FIG. 1 may be implemented to physically realize AQC by initializing the system with the Hamiltonian described by equation 2 and evolving the system to the Hamiltonian described by equation 3 in accordance with the evolution described by equation 1. To this end, quantum processor 100 includes a plurality of programming interfaces 121-125 that are used to configure and control the state of quantum processor 100. Each of programming interfaces 121-125 may be realized by a respective inductive coupling structure, as illustrated, that communicates with a programming system (not shown). Such a programming system may be separate from quantum processor 100, or it may be included locally (i.e., on-chip with quantum processor 100) as described in US Patent Publication 2008-0215850.

In the operation of quantum processor 100, programming interfaces 121 and 124 may each be used to couple a flux signal into a respective compound Josephson junction 131, 132 of qubits 101 and 102, thereby realizing the $\Delta_i$ terms in the system Hamiltonian. This coupling provides the off-diagonal $\sigma^x$ terms of the Hamiltonian described by equation 2 and these flux signals are examples of "disordering signals." Similarly, programming interfaces 122 and 123 may each be used to couple a flux signal into a respective qubit loop of qubits 101 and 102, thereby realizing the $h_i$ terms in the system Hamiltonian. This coupling provides the diagonal $\sigma^z$ terms of equation 3. Furthermore, programming interface 125 may be used to couple a flux signal into coupler 111, thereby realizing the $J_{ij}$ terms in the system Hamiltonian. This coupling provides the diagonal $\sigma_i^z\sigma_j^z$ terms of equation 3. In FIG. 1, the contribution of each of programming interfaces 121-125 to the system Hamiltonian is indicated in boxes 121a-125a, respectively.

Throughout this specification and the appended claims, the term "quantum system" is used to generally describe the collection of qubits (e.g., qubits 101 and 102) and couplers (e.g., coupler 111) included in a quantum processor (e.g., processor 100). Similarly, the term "operational subsystem" is used to generally describe the programming elements (e.g., programming interfaces 121-125) included in a quantum processor (e.g., processor 100) and other associated control circuitry or instructions. As previously described, the programming elements of the operational subsystem may communicate with a programming system which may be separate from the quantum processor or included locally on the processor.

The approach to AQC described by equations 1, 2 and 3 may typically produce a final Hamiltonian (equation 3) that includes undesirable local minima. The presence of local minima reduces the size of the minimum gap, thereby increasing the necessary computation time. In typical AQC approaches, all local minima influence the computation time because all local minima are present in the effective computation space.

Figure 2:
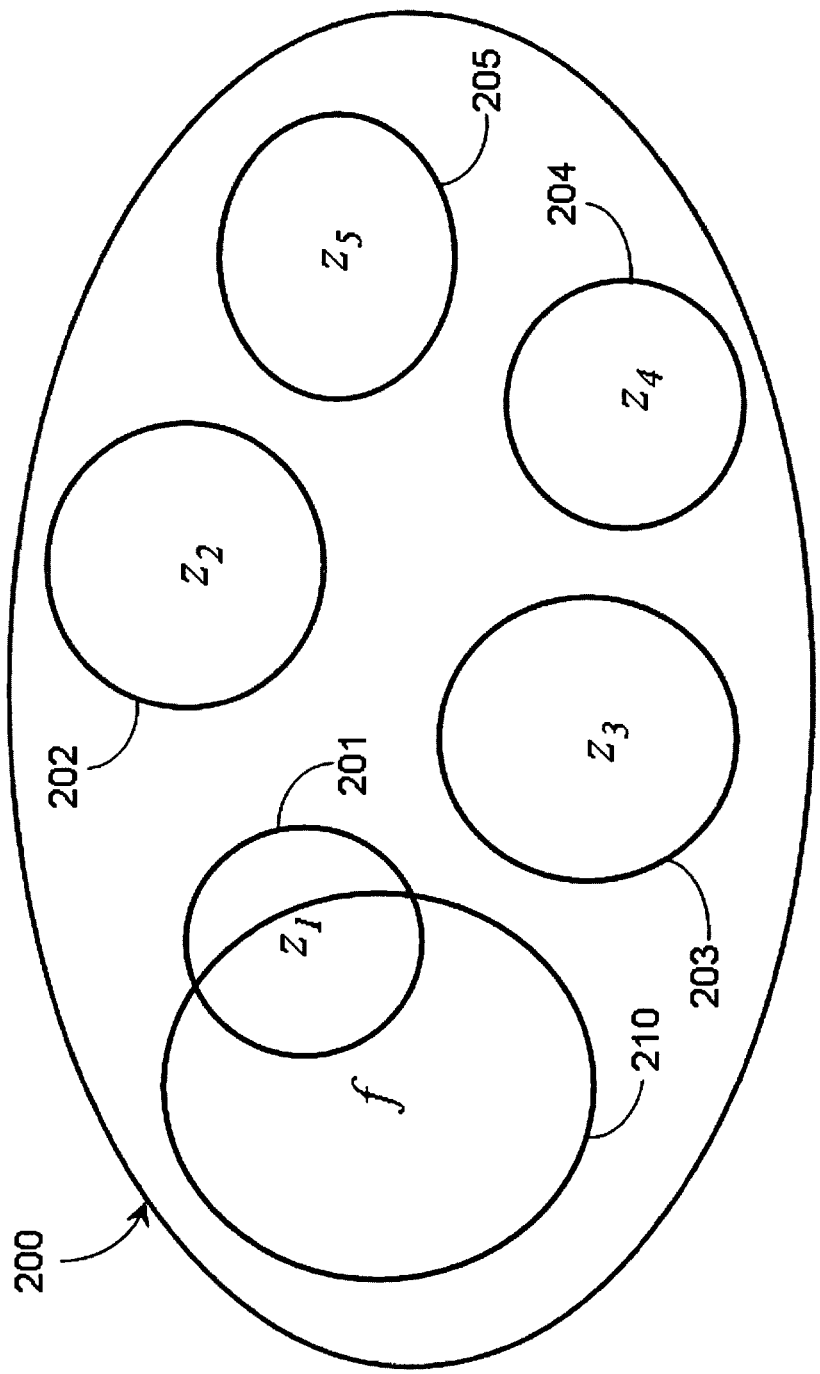
FIG. 2 is an illustrative representation of an embodiment of a simplified computation space that may be realized in a typical implementation of adiabatic quantum computation.

FIG. 2 is an illustrative representation of an embodiment of a simplified computation space 200 that may be realized in a typical implementation of AQC. Computation space 200 includes five local minima $z_1$-$z_5$. Each of local minima $z_1$-$z_5$ is located within a respective energy well, represented by circles 201-205, respectively. The actual local minimum $z_1$-$z_5$ is typically located at approximately the center of each corresponding energy well or circle 201-205. Computation space 200 includes a global minimum f located in an energy well represented by circle 210, where the global minimum f may be taken to be approximately at the centre of circle 210. The purpose of FIG. 2 is to show that, in standard AQC approaches, the effective computation space includes the global minimum f and all of the local minima $z_1$-$z_5$.

A common approach to AQC is to start with an initial Hamiltonian $H_{in}$ that is non-diagonal (or "off-diagonal") in the computation basis (e.g., equation 2) and to evolve to a final or "problem" Hamiltonian $H_f$ that is diagonal in the computation basis (e.g., equation 3). When $H_f$ has many local minima, the size of the minimum gap may be quite small and it may be necessary to increase the evolution time t to compensate for the small gap size.

In accordance with some embodiments of the present systems, methods and apparatus, the evolution time t of AQC may be reduced compared to known approaches by initializing the system with a mixed initial Hamiltonian that includes both diagonal and off-diagonal terms. An example of such a mixed initial Hamiltonian is given in equation 4:

$$H_{In}^k = -\frac{\Delta}{2}\sum_{i=1}^{n}\sigma_i^x + \sum_{i=1}^{n}l_i\sigma_i^z \qquad (4)$$

where $l_i$ are dimensionless local fields coupled into each qubit. The initial Hamiltonian described by equation 4 is similar to that described by equation 2, except that the diagonal component (5) is added:

$$\sum_{i=1}^{n} l_i \sigma_i^z \qquad (5)$$

The coefficients $l_i$ represent assigned qubit values. By applying dimensionless local fields to each qubit, the system may be initialized in a predetermined state |L> which is manifested by a bit-string (e.g., |L>=|011 . . . 1>). The energy of component 5 may be convex around state |L>, introducing an energy penalty for states that are far away in Hamming distance from |L> (i.e., states that differ from |L> by a large number of bit flips). This energy penalty increases for states that are further from state |L>. This way, the ground state of the initial wave-function may be limited to a superposition of only those states that are close in Hamming distance to |L>, as opposed to a superposition of all the states. |L> therefore may serve as a center point in a ball whose size is influenced by the ratio of $\Delta_i:l_i$ in the initial Hamiltonian 4. The word "ball" is used herein to describe the area that contributes to the superposition of the ground state of the initial wave-function. If all $\Delta_i$ values are the same and all the $l_i$ values have the same magnitude, this area becomes a hypersphere in the computation space, which is where the term "ball" comes from. However, if the $\Delta_i$ values and the Ij values are different for different qubits, then the area may have a different shape. By initializing the system with the Hamiltonian described by equation 4, the effective computation space may be reduced in size by limiting the evolution of the system to states within the ball centered around |L>. If the center point |L> is well chosen, the ball may include fewer local minima than the whole computation space and therefore the size of the minimum gap in the adiabatic evolution may be increased as some local minima are avoided.

Throughout this specification and the appended claims, a local minimum is considered "avoided" during an evolution of a system Hamiltonian if the state of the system (e.g., the state of the quantum processor) settles somewhere outside the local minimum. Preferably, when a first local minimum is avoided the state of the system will settle in an alternative minimum that is either the global minimum or a second local minimum of lower energy than the first local minimum.

Figure 3:
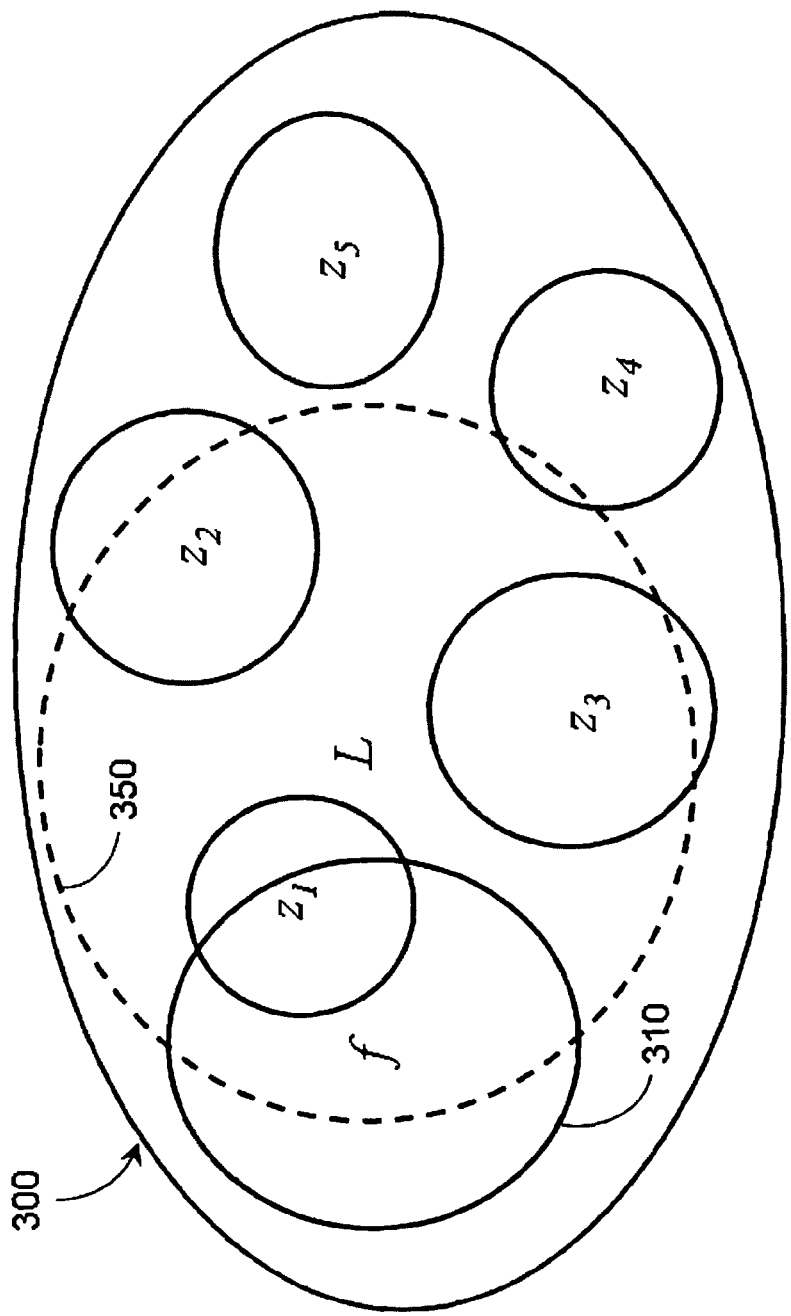
FIG. 3 is an illustrative representation of an embodiment of a simplified computation space that may be realized in an implementation of adiabatic quantum computation with a mixed initial Hamiltonian.

FIG. 3 is an illustrative representation of an embodiment of a simplified computation space 300 that may be realized in an implementation of AQC with a mixed initial Hamiltonian. For illustrative purposes, computation space 300 is similar to computation space 200 of FIG. 2, though those of skill in the art will appreciate that a computation space may take on a wide variety of forms and may include a different number and arrangement of local minima than the five local minima $z_1$-$z_5$ shown in FIGS. 2 and 3.

Computation space 300 includes a global minimum at f that is situated within an energy well represented by circle 310. In accordance with some embodiments of the present systems, methods and apparatus, computation space 300 represents an implementation of AQC with a mixed initial Hamiltonian. In some embodiments, AQC with a mixed initial Hamiltonian may be used to implement AQC with covering. AQC with a mixed initial Hamiltonian may begin by initializing the system with a Hamiltonian similar to that described by equation 4. The system may begin, for example, in a superposition of states within a ball with a center point at L, and the evolution may be substantially confined to the computation space within the ball. In FIG. 3, this ball is represented by circle 350 (hereafter referred to as "ball 350"). While ball 350 is illustrated as being circular in FIG. 3, those of skill in the art will appreciate that a ball may take on a variety of geometric forms, including irregular shapes. As such, the term "center point" is used throughout this specification and appended claims to indicate the state within a ball for which the energy penalty introduced by component 5 is at a minimum, such that this energy penalty increases as the state of the system moves away (by flipping bits) in any direction from the center point. In various embodiments, the center point may or may not correspond to the geometric center of a ball.

In some embodiments, ball 350 may include fewer local minima than computation space 300, thus the size of the minimum gap in an implementation of AQC within ball 350 may be large compared to an implementation of AQC within all of computation space 300. For example, in FIG. 3, ball 350 does not include local minima $z_4$ and $z_5$. In computation space 300, the five local minima $z_1$-$z_5$ may influence the minimum gap size of the system, establishing a gap of size $g_1$. Conversely, in ball 350, only three local minima $z_1$-$z_3$ may influence the minimum gap size of the system, establishing a gap size of $g_2$ where $g_2 > g_1$. Ball 350 includes the global minimum f and fewer local minima z, therefore it is more likely that an adiabatic evolution within ball 350 will reach global minimum f compared to an adiabatic evolution in computation space 300 within the same amount of time.

In implementations of AQC with a mixed initial Hamiltonian, the solution obtained is limited to being a state within the ball as opposed to any state within the entire computation space. In many applications of AQC, it is ultimately the global minimum that is of particular interest; therefore, it can be desirable to establish a ball that includes the global minimum. Recall that the center point (|L>) is set by assigning values $l_i$ to each of the qubits in accordance with component 5. This determines the center point of ball 350 (i.e., center point of circle 350) in FIG. 3. In addition, the size of the ball 350 (i.e., the radius of circle 350 in FIG. 3) may be set by adjusting the ratio of $\Delta:l_i$. In some embodiments, the center point may be established by the signs of the $l_i$-values. For example, a positive $l_i$-value may correspond to a first qubit state (e.g., "1") and a negative $l_i$-value may correspond to a second qubit state (e.g., "0"), such that the signs of the $l_i$-values define a bit string (e.g., |010 . . . 0>). In some embodiments, the size of ball 350 may be established by the magnitudes of the $l_i$-values. Thus, for a given center point |L>, the size of the ball may be controlled by adjusting the magnitudes of the $l_i$-values.

In many applications, it would be preferred if a ball contained the global minimum and no local minima. Unfortunately, the position of the global minimum is typically not known. In some embodiments of the present systems, methods and apparatus, AQC with covering may involve serially running multiple iterations of AQC with a mixed initial Hamiltonian, where each iteration uses a different ball. In such embodiments, each iteration may be initialized with a different center point and/or a different ball size. In this way, the computation space (such as computation space 300) may be covered by a set of balls, where the adiabatic evolution within each ball may be faster than the adiabatic evolution in the entire computation space. In equation 4, the k superscript in $H_{in}^k$ is used to indicate the particular ball (in a set of k balls) to which the particular mixed initial Hamiltonian corresponds. In some embodiments, the sum of the computation times for each ball in a set of k balls that covers the computation space is less than the single computation time for the total computation space. As previously discussed, the computation space is considered to be "covered" if every point in the computation space is included in at least one of the k balls.

Figure 4:
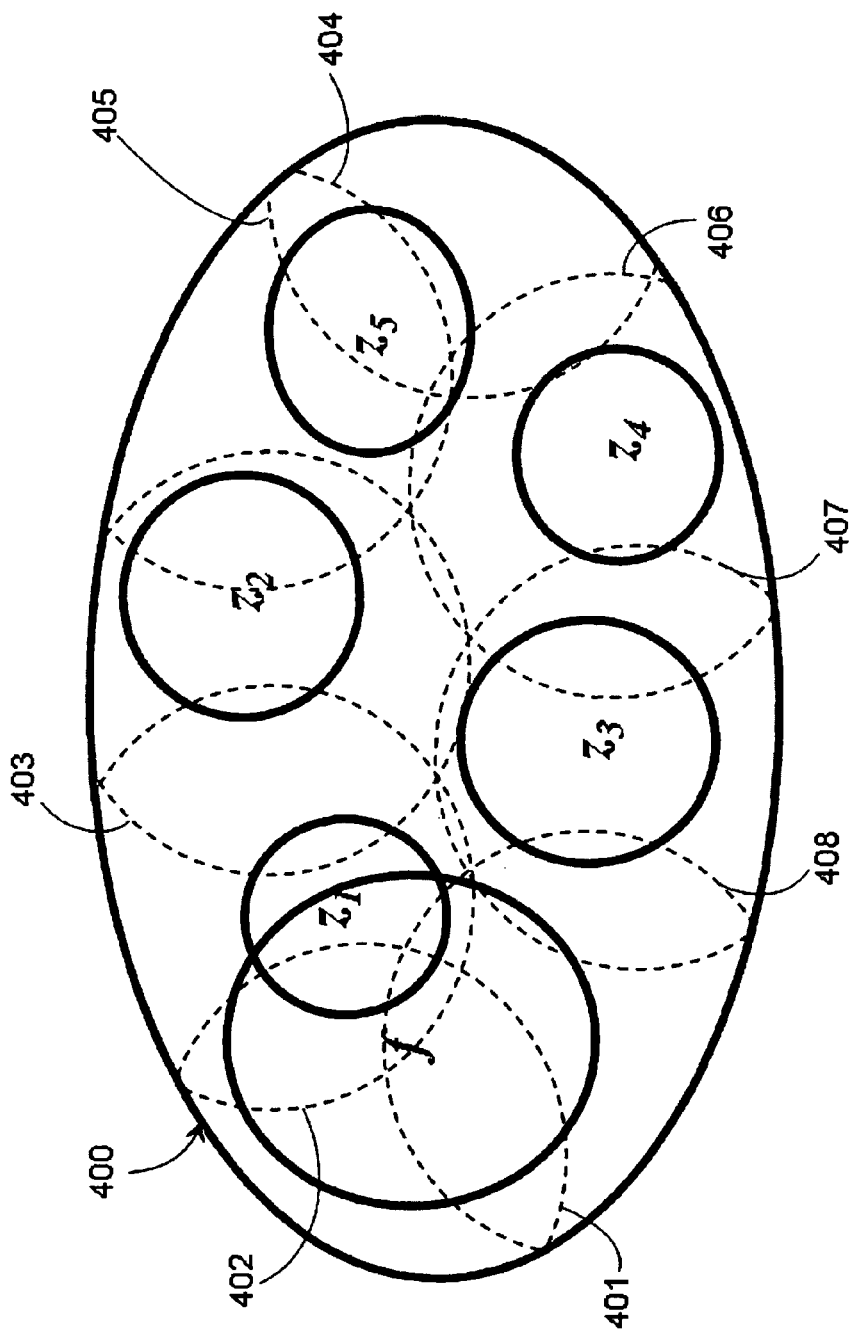
FIG. 4 is an illustrative representation of an embodiment of a simplified computation space that is covered by a set of eight balls.

FIG. 4 is an illustrative representation of an embodiment of a simplified computation space 400 that is covered by a set of eight balls represented by broken line circles 401-408. As stated previously, while balls 401-408 are illustrated as being circular in FIG. 4, those of skill in the art will appreciate that balls may be realized in a wide variety of geometric forms. Computation space 400 is covered by balls 401-408 because every point in computation space 400 is included in at least one of balls 401-408. The portion of each of balls 401-408 that extends beyond computation space 400 is not shown in FIG. 4 because only those points that cover computation space 400 are of interest. Furthermore, those of skill in the art will appreciate that computation space 400 may be covered by any number of balls in any arrangement. In various embodiments, the balls may be different in size from balls 401-408 (e.g., larger or smaller in radius) and they may be arranged with different center points. In some embodiments, computation space 400 may represent the full computation space and therefore each of balls 401-408 may be fully contained within computation space 400 (similar to ball 350 in FIG. 3). In other embodiments, computation space 400 may represent a subspace of the full computation space and all or any one of balls 401-408 may be either fully contained within computation 400 or only partially contained within computation space 400. In some embodiments, a covering may be established where all balls have the same radius. In other embodiments, a covering may be established where the radius at least one ball is different from the radius of at least one other ball. While the balls may overlap, in some applications it is preferred that each center point be contained in only one ball such that no center point is overlapped by another ball.

Those of skill in the art will appreciate that a covering may be established in a variety of different ways and many techniques for generating a covering are known in the art. In general, the computation time for any given ball may decrease as the radius of the ball decreases; however, implementing smaller balls means that, typically, more balls are required to complete the covering and thus more iterations are needed. This tradeoff between ball size and number of iterations ultimately affects the total computation time. The present systems, methods and apparatus provide a few examples of how a covering may be established, though those of skill in the art will appreciate that alternative techniques may also be used.

In some embodiments, a covering may be established by implementing a "covering code" wherein a set of points is selected such that all other points in the space are separated from at least one of the points in the set by a distance smaller than m. The number of such points is usually denoted by K(n, m). Using this scheme, the total computation time to implement AQC with covering is approximately:

$$t_{total} \sim K(n,m) \cdot T_m,$$

where $T_m \sim E/g_m^2$ with a global annealing schedule and $T_m \sim 1/g_m$ with a local annealing schedule. Further detail of covering by a covering code is described in Graham et al., "On the Covering Radius of Codes", IEEE Trans. Information Theory, Vol. 31 (1985), pp. 385-401.

Figure 5:
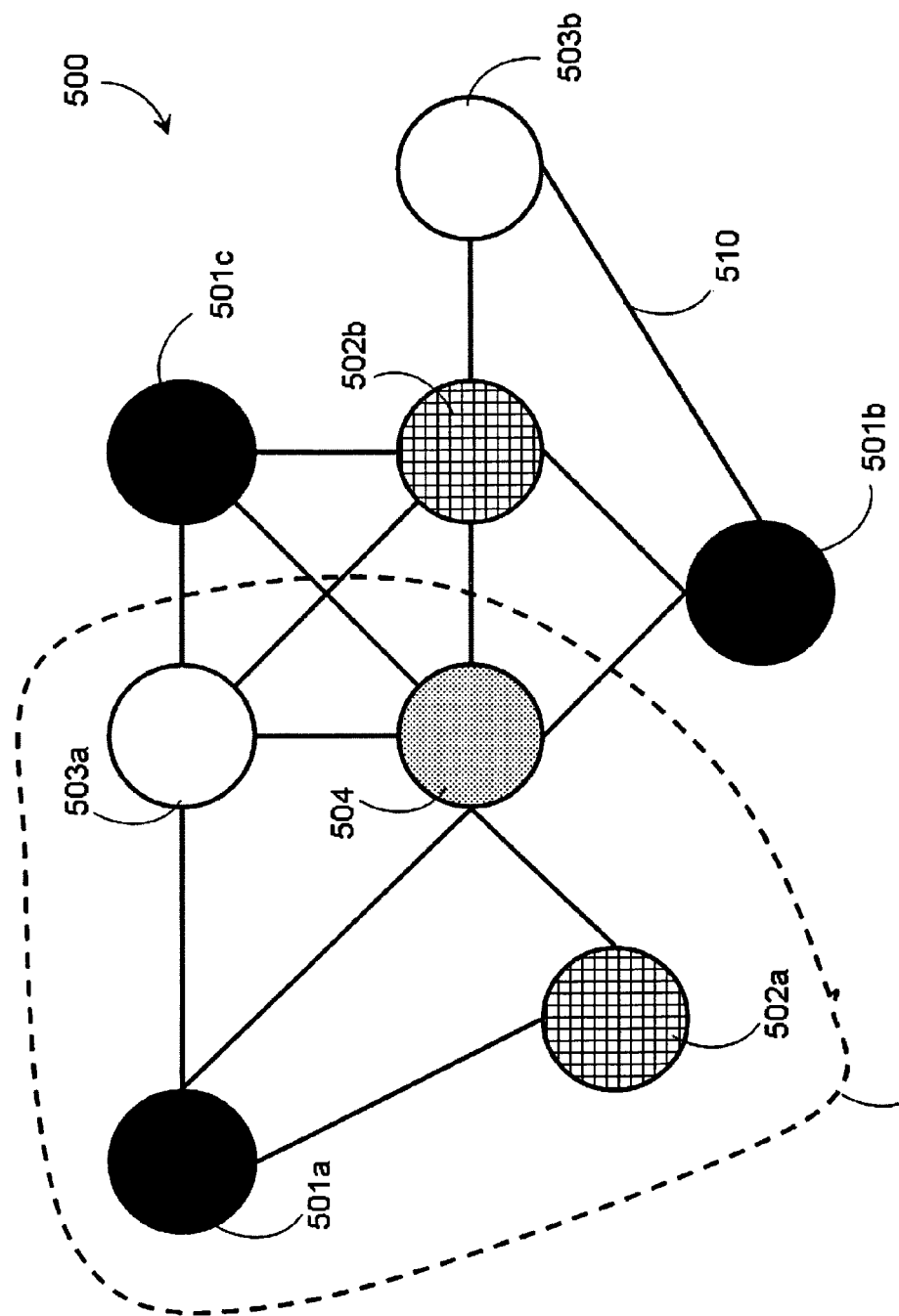
FIG. 5 is an illustrative example of an embodiment of a problem graph that has been colored according to the vertex coloring technique.

In some embodiments, a covering may be established by "vertex coloring" wherein a number of colors are assigned to the problem graph such that no two connected vertices share the same color. FIG. 5 is an illustrative example of an embodiment of a problem graph 500 that has been colored according to the vertex coloring technique. Problem graph 500 includes eight vertices 501a-501c, 502a, 502b, 503a, 503b, 504 and fourteen edges 510 (only one called out in the Figure), though those of skill in the art will appreciate that a given problem graph may include any number of vertices and edges and, typically, a much greater number of each than used in FIG. 5. Problem graph 500 is "colored" using four colors (denoted by 501-504) such that no two connected vertices share the same color. For example, vertex 501c is black (501) and connected to three other vertices 502b, 503a, 504. Because vertex 501c is black, none of vertices 502b, 503a, 504 are black. In the numbering scheme used in the Figure, no two "501" vertices share an edge, no two "502" vertices share an edge, no two "503" vertices share an edge, and there is only one "504" vertex. This vertex coloring technique may be used to establish a "vertex covering" by defining a set of balls, where each ball is made up of a set of vertices that includes one vertex of each color. In the case of problem graph 500, each ball includes four vertices because there are four colors in the coloring. The number of balls is then determined by the number of unique combinations of vertices having no two vertices sharing the same color. For example, problem graph 500 shows a ball represented by broken line 520 that includes vertices 501a, 502a, 503a, and 504. Though only one exemplary ball is shown in FIG. 5 to reduce clutter, problem graph 500 may be covered by the set of all such balls.

For many applications of AQC, the global minimum may correspond to a feature, such as the maximum independent set or the maximum clique, of a problem graph. The maximum independent set is the largest group of vertices having the property that no two vertices in the group are connected together by an edge. The maximum clique is the largest group of vertices having the property that each pair of vertices in the group is connected together by a respective edge. From the definition of maximum clique, it follows that every vertex in a maximum clique will have a unique color if vertex coloring is applied. Therefore, when vertex coloring is used to generate a vertex cover, it follows that at least one ball will include a maximum clique. In the context of AQC, this ensures that at least one ball will include the global minimum.

In some embodiments, a covering may be established by a random set of center points. In such embodiments, it may be preferable to ensure that each center point is included in only one ball (i.e., the ball for which it is the center).

Those of skill in the art will appreciate that there are many more known techniques for generating a covering than those techniques described herein. The technique that is employed in an implementation of AQC with covering may depend on a variety of factors, including the size and nature of the problem to be solved and the system available to generate the covering. In some embodiments, a covering may be generated using classical heuristic techniques and/or classical computing systems. In other embodiments, a quantum processor may be used to generate a covering that is used in a subsequent quantum computation.

Figure 6:
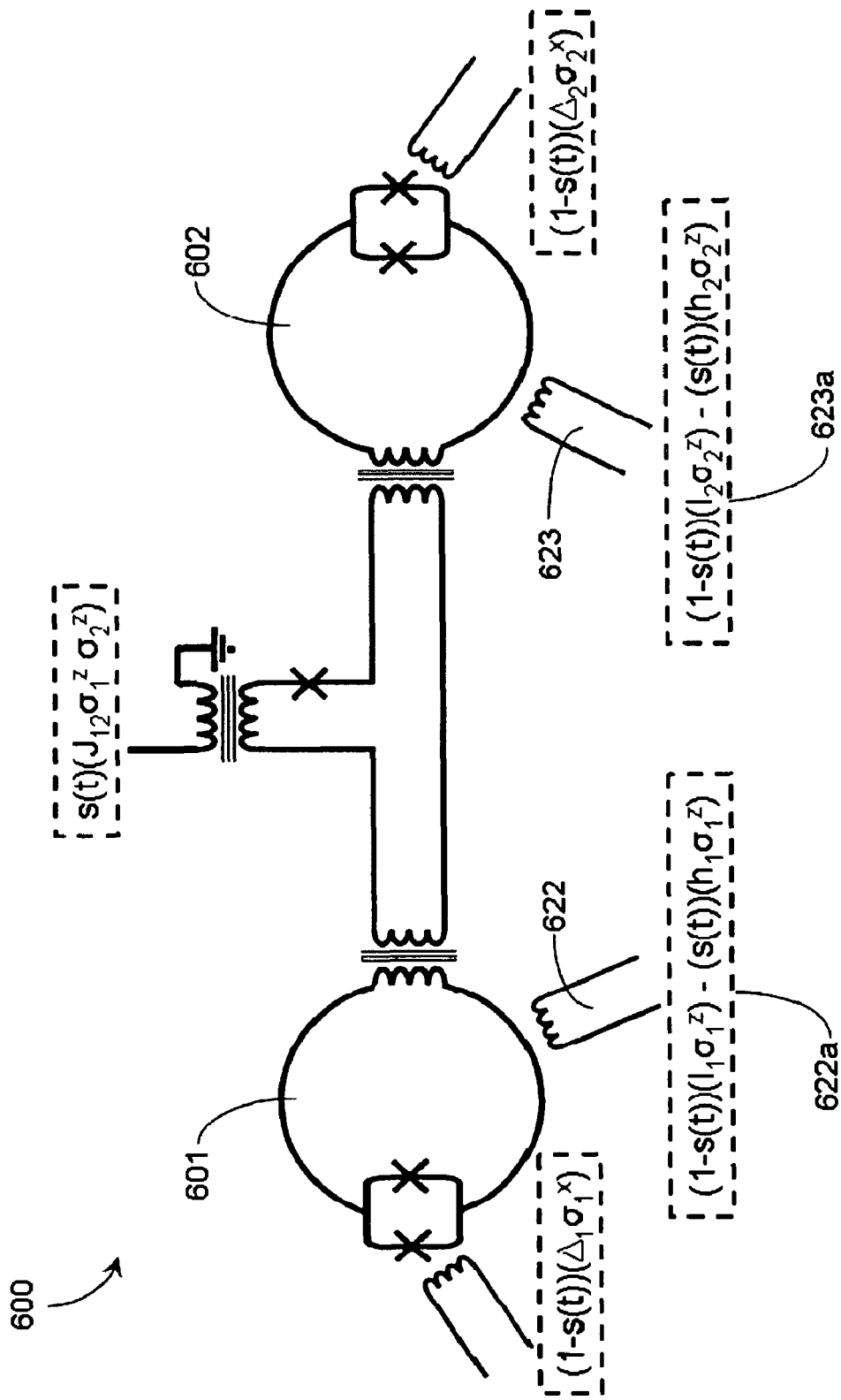
FIG. 6 is a schematic diagram of an embodiment of a portion of a superconducting quantum processor designed for adiabatic quantum computation with covering.

AQC with covering may be implemented using the same hardware as that used for typical approaches to AQC and/or quantum annealing. FIG. 6 is a schematic diagram of an embodiment of a portion of a superconducting quantum processor 600 designed for AQC with covering. In this example, quantum processor 600 is similar to quantum processor 100 from FIG. 1; the principal difference between the two is the form of the signals that are coupled through programmable interfaces 622 and 623 and the consequent operation of the processor. In implementations of AQC with covering, the flux signals that are coupled into the qubit loop of each qubit (e.g., qubits 601 and 602) are initially used to establish the diagonal $l_i$ terms of equation 4 and are gradually evolved (in accordance with equation 1) to establish the diagonal $h_i$ terms of equation 3. In FIG. 6, box 622a shows a representation of the signal that is coupled through programmable interface 622 into qubit 601 and box 623a shows a representation of the signal that is coupled through programmable interface 623 in qubit 602. In both cases, the initial signal (when s(0)=0) establishes the $1_i$ terms and the final signal (when s(T)=1) establishes the $h_i$ terms. In alternative embodiments, multiple programming interfaces may be coupled to the qubit loop of the same qubit in order to facilitate control of the $1_i$ and $h_i$ signals.

Throughout this specification, the evolution of a quantum processor is repeatedly described according to the coefficient s(t), where s(0)=0 at the beginning of the evolution and s(T)=1 at the end of the evolution. Those of skill in the art will appreciate that the evolution s(t) in between t=0 and t=T may be realized in a variety of ways. In some embodiments, s(t) may evolve linearly from s(0)=0 to s(T)=1. However, in other embodiments, s(t) may evolve in a non-linear fashion, including but not limited to a polynomial evolution, an exponential evolution, a logarithmic evolution, and/or a piece-wise evolution.

Figure 7:
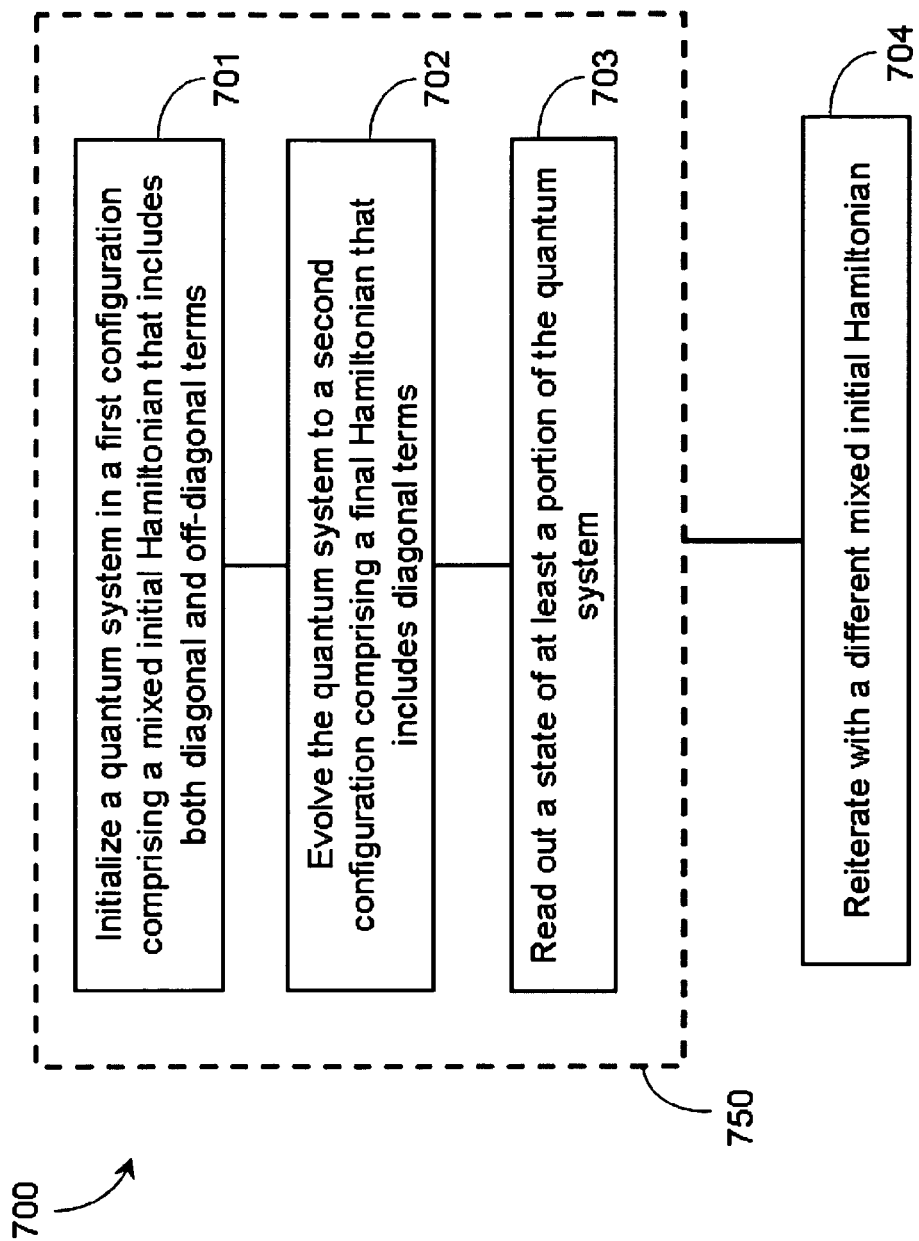
FIG. 7 is a flow-diagram of an embodiment of a general method for performing AQC with a mixed initial Hamiltonian.

FIG. 7 is a flow-diagram of an embodiment of a general method 700 for performing AQC with a mixed initial Hamiltonian. Method 700 includes sub-method 750, and sub-method 750 includes three acts 701-703, though those of skill in the art will appreciate that additional acts or steps may be included in various applications of method 700 and/or sub-method 750. In act 701, a quantum system is initialized in a first configuration that represents (e.g., physically represents), comprises or otherwise embodies a mixed initial Hamiltonian that includes both diagonal and off-diagonal terms. The Hamiltonian described by equation 4 is an example of an appropriate mixed initial Hamiltonian. As described previously, a mixed initial Hamiltonian may be realized with superconducting qubits by coupling a first signal to the X-degree of freedom of each qubit (thereby contributing off-diagonal terms to the system Hamiltonian, as in equation 2) and coupling a second signal to the Z-degree of freedom of each qubit (thereby contributing diagonal terms to the system Hamiltonian, as in component 5). With superconducting flux qubits, this is achieved by coupling a first flux signal to the compound Josephson junction of each qubit and a second flux signal to the qubit loop of each qubit. In act 702, the quantum system is evolved to a second configuration that represents (e.g., physically represents), comprises or otherwise embodies a final Hamiltonian that includes diagonal terms. The Hamiltonian described by equation 3 is an example of an appropriate final Hamiltonian. As described previously, this evolution may include an adiabatic evolution. In some embodiments, an adiabatic evolution may be achieved by gradually evolving the first flux signal that is coupled to the compound Josephson junction of each qubit, gradually changing the value of the second flux signal that is coupled to the qubit loop of each qubit, and gradually establishing a coupling signal between at least two qubits.

In some embodiments, the system may be initialized in a ground state of the mixed initial Hamiltonian in act 701 and the evolution of act 702 may be adiabatic such that the system remains in a ground state throughout the evolution. In act 703, a state of at least a portion of the quantum system is read out. In some embodiments, act 703 may include reading out the state of all or a subset of qubits in the quantum system. In some embodiments, the final Hamiltonian of act 702 encodes a solution to a problem and reading out a state of the system as in act 703 includes establishing a representation of a solution to a problem. In some embodiments, sub-method 750 represents all of the acts that are implemented.

In some embodiments, the diagonal terms of the mixed initial Hamiltonian configured in act 701 serve, at least in part, to define a center point of a first computation space that is at least partially contained within a second computation space, where the second computation space is larger than the first computation space. In such embodiments, the first computation space may be used as a ball and a plurality of such balls may be used to cover the second computation space. Thus, in some applications act 704 of method 700 may include reiterating sub-method 750 a plurality of times, where each iteration involves initializing the quantum system with a different mixed initial Hamiltonian. In act 704, each mixed initial Hamiltonian (that is, each sequential iteration) corresponds to a different ball with a different center point. In the ways already described (i.e., covering code, vertex coloring, random selection, or any other covering technique) the plurality of balls may be used to cover the second computation space, thereby ensuring that the global minimum is included in at least one iteration of sub-method 750.

In addition to the concepts of AQC with a mixed initial Hamiltonian and AQC with covering, various embodiments described herein provide further systems, methods and apparatus for tailoring an initial Hamiltonian to avoid local minima during an adiabatic quantum computation and/or during an implementation of quantum annealing. Since adiabatic quantum computation may be regarded as a special case of quantum annealing, throughout the remainder of this specification, the term "quantum annealing" is used to encompass implementations of quantum annealing and/or adiabatic quantum computation.

Conventional approaches to quantum annealing involve configuring a quantum processor in an initial state by the calibrated application of static control signals. Generally, the disorder term $\Gamma$ is then applied in the form of a global disordering signal that induces single qubit tunnel splitting $\Delta_i$ in each qubit. The evolution of the single qubit tunnel splitting $\Delta_i$ is defined by the annealing schedule, which drives the quantum computation. In general, the same disordering signals is applied to induce substantially the same tunnel splitting, or "tunneling amplitude" $\Delta_i$ in each qubit according to the same annealing schedule. The goal of quantum annealing is to evolve the quantum processor towards a low-energy state, typically preferably its ground state. The ground state of a quantum processor typically corresponds to the global minimum of the problem Hamiltonian, which may be manifested in the form of the "deepest" well in the energy landscape of the problem Hamiltonian. However, as previously described, the energy landscape of the problem Hamiltonian also typically includes at least one local minimum which may be manifested in the form of a well in the energy landscape of the problem Hamiltonian that is less "deep" than the global minimum. In theory, the single qubit tunnel splitting (of tunneling amplitude $\Delta_i$) provides a mechanism for escaping local minima by quantum tunneling through an energy barrier towards a lower energy state. However, in practice, the evolution of a quantum processor can become trapped in a local minimum (e.g., if the energy barrier is too large to penetrate by quantum tunneling), thereby preventing the system from reaching its ground state during the annealing process. This can result in an unsatisfactory solution to the computational problem. The present systems, methods and apparatus generally provide techniques for avoiding local minima by introducing specific adaptations to the initial Hamiltonian. In some embodiments, an initial Hamiltonian may be adapted to include inhomogeneous off-diagonal terms to realize inhomogeneous tunneling amplitudes $\Delta_i$ during the evolution of a quantum processor.

The various embodiments described herein are particularly well-suited for applications of quantum annealing using a quantum processor comprising superconducting flux qubits. However, those of skill in the art will appreciate that the concepts embodied in the present systems, methods and apparatus may be applied to other forms of quantum processors and other forms of quantum computation.

Referring again to FIG. 1, a straightforward approach to quantum annealing with superconducting flux qubits is to induce homogenous tunneling amplitudes $\Delta_i$ in the qubits 101, 102 that make up the quantum processor 100. That is, a global signal line is typically used to couple the same disordering signal to the CJJ 131, 132 of each qubit 101, 102, respectively, through, for example, a respective programming interface 121, 124. Inducing the same tunneling amplitude $\Delta$ in each qubit can be advantageous due to its simplicity. However, for some problem Hamiltonians certain qubits may be more likely than others to influence the system behavior around particular local minima. Hence, certain qubits may be predicted to contribute a local minimum to a problem Hamiltonian. In accordance with the present systems, methods and apparatus, the likelihood of avoiding and/or escaping a particular local minimum in the energy landscape of a particular problem Hamiltonian may be increased by inducing higher tunneling amplitudes $\Delta_i$ in a particular qubit or set of qubits in the quantum processor.

Figure 8:
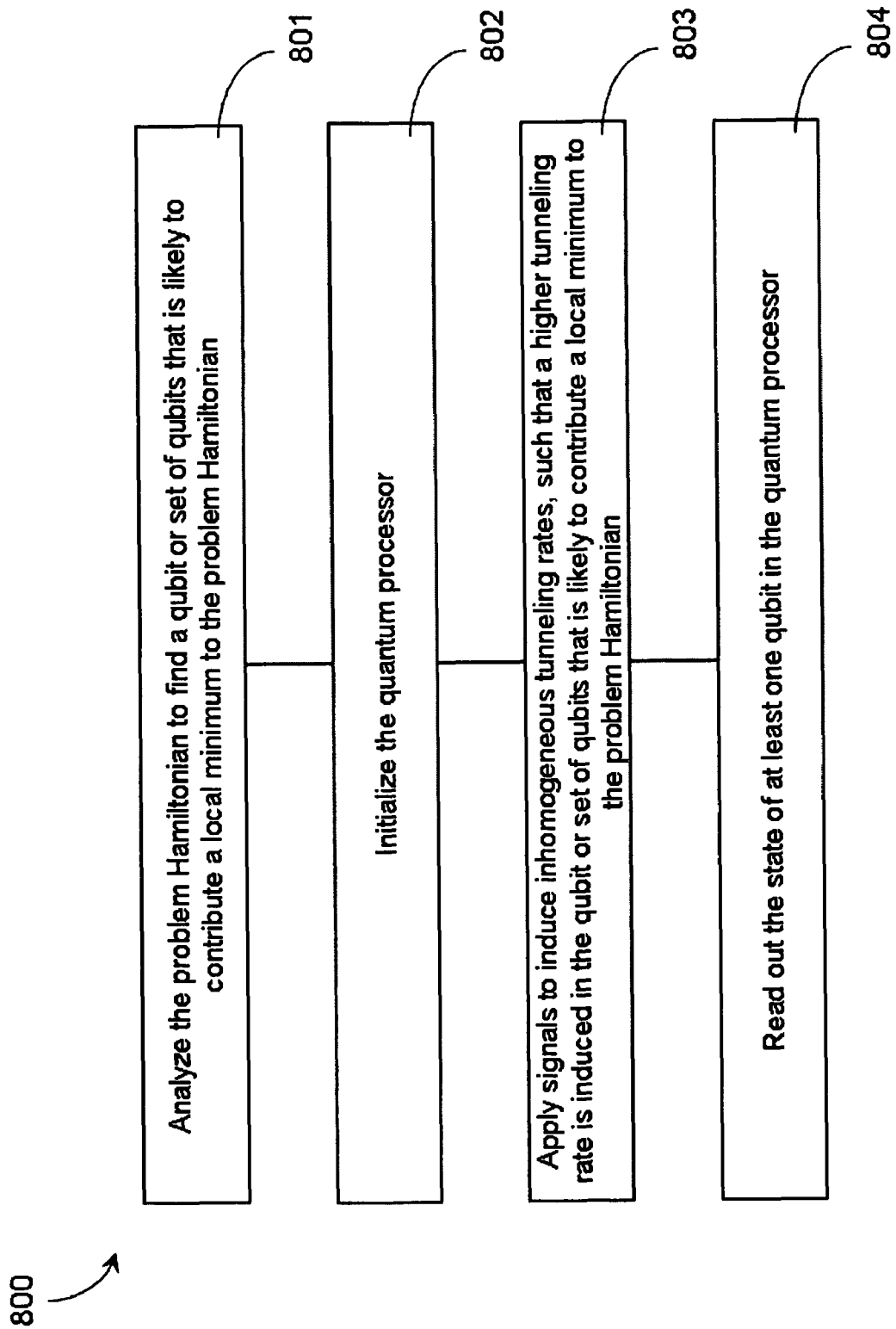
FIG. 8 is a flow diagram of showing a general method for quantum computation with inhomogeneous tunneling amplitudes, according to one illustrated embodiment.

FIG. 8 is a flow diagram of an embodiment of a general method 800 for quantum computation with inhomogeneous tunneling amplitudes $\Delta_i$. Method 800 comprises four acts 801-804, though other acts may be included at any stage of method 800 and acts 801-804 need not necessarily be performed in the order depicted in FIG. 8. At 801, the problem Hamiltonian may be analyzed to determine which, if any, qubit or set of qubits is predicted to contribute a local minimum to the energy landscape of the problem Hamiltonian. An example of a set of qubits that may contribute a local minimum to the problem Hamiltonian is a set of qubits that establishes a domain. A domain may be established, for instance, by a set of qubits that are coupled to each other particularly strongly compared to other qubits. Alternatively, a domain may be established by a set of qubits that exhibit particularly high $h_i$ terms. In some embodiments, the analysis 801 may be computationally performed classically using a classical computer system such as a digital computer.

At 802, the quantum processor is initialized by, for example, applying the necessary control signals to establish the particular combinations of $h_i$ and $J_{ij}$ terms that correspond to the desired problem Hamiltonian. In some embodiments, the initial values of some or all of the $h_i$ and $J_{ij}$ terms may be zero. In some embodiments, the quantum processor, or at least, the initialization of the quantum processor, may be used in the analysis of the problem Hamiltonian 801. In such embodiments, it may be preferred to perform the initialization 802 before the analysis 801.

At 803, the quantum processor is evolved by applying disordering signals to the qubits of the quantum processor. This may be achieved by inducing quantum tunneling in each qubit. In accordance with the present systems, methods and apparatus, the corresponding tunneling amplitudes $\Delta_i$ may be induced in an inhomogeneous way such that a higher tunneling amplitude is induced in the qubit or set of qubits that is predicted to contribute a local minimum to the problem Hamiltonian, as determined in the analysis 801. This inhomogeneous evolution constitutes, at least in part, the quantum computation. The evolution may, therefore, be an implementation of quantum annealing and/or adiabatic quantum computation. At 804, the evolution is complete and the state of at least one qubit may be read out from the quantum processor.

The $h_i$ and $J_{i,j}$ terms that define the problem Hamiltonian (e.g., equation 3) also contribute to the energy landscape of the problem Hamiltonian. Specifically, a local minimum may be produced in the energy landscape of the problem Hamiltonian by a set of qubits that are particularly strongly coupled together through applied $J_{i,j}$ terms. In the present systems, methods and apparatus, it is recognized that a set of strongly inter-coupled qubits may directly contribute a local minimum to the energy landscape of the problem Hamiltonian, and the chances of avoiding this local minimum during a quantum computation may be improved by accordingly applying signals to induce higher tunneling amplitudes $\Delta_i$ in each qubit in the set of strongly inter-coupled qubits.

In general, certain terms in the Hamiltonian tend to influence the qubit towards order; these terms may be referred to as "ordering forces" and include the applied $h_i$ and $J_{ij}$ terms. Conversely, certain terms in the Hamiltonian tend to influence the qubit towards disorder; these terms may be referred to as "disordering forces" and include the tunneling amplitudes $\Delta_i$. Disordering forces promote quantum fluctuations in the system (e.g., the quantum processor) and influence the ground state towards a superposition of states. During adiabatic quantum computation or quantum annealing, such quantum fluctuations are used to evolve the system towards the ground state. It is typically desired that the disordering forces outweigh the ordering forces at the beginning of the evolution, with the balance gradually shifting towards order as the evolution proceeds. When the ordering forces outweigh the disordering forces, a quantum phase transition may occur from a disordered phase to an ordered phase. If a particular set of qubits establishes a domain, then that particular set of qubits may experience a stronger ordering force. For example, if the inter-couplings between a particular set or group of qubits are stronger than the inter-couplings between the other qubits, then that particular set or group of qubits may experience a stronger ordering force. In this case, if the disordering force is applied uniformly to all qubits then the particular set or group of strongly inter-coupled qubits will tend to become ordered before the rest of the system, potentially creating a local minimum. In accordance with some embodiments of the present systems, methods and apparatus, such local minima may be avoided by applying stronger disordering signals to those qubits which experience stronger ordering forces during the evolution.

Figure 9:
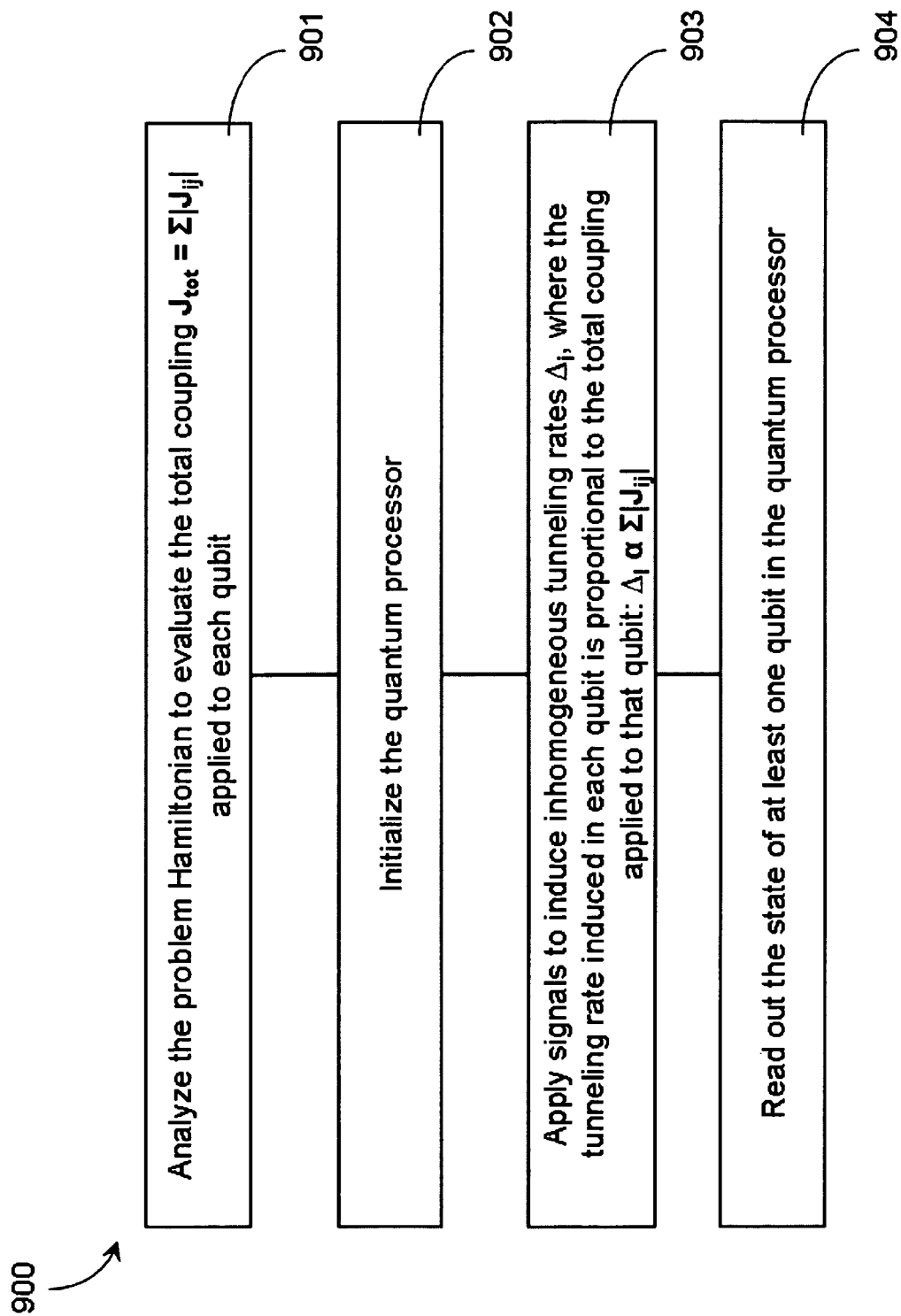
FIG. 9 is a flow diagram showing a method for quantum computation with inhomogeneous tunneling amplitudes, according to one illustrated embodiment, where the magnitude of the tunneling amplitude applied to any particular qubit is directly related to the total coupling applied to that qubit.

FIG. 9 is a flow diagram of an embodiment of a method 900 for quantum computation with inhomogeneous tunneling amplitudes $\Delta_i$, where the magnitude of the tunneling amplitude induced in any particular qubit is directly related to the total coupling applied to that qubit. Method 900 comprises four acts 901-904, though other acts may be included at any stage of method 900 and acts 901-904 need not necessarily be performed in the order depicted in FIG. 9. At 901, the problem Hamiltonian may be analyzed to evaluate the total coupling applied to each qubit. The total coupling $J_{tot}$ applied to the $i^{th}$ qubit in the quantum processor may be given by:

$$J_{tot} = \sum_j |J_{ij}|$$

That is, the total coupling $J_{tot}$ applied to the $i^{th}$ qubit may be given by the sum of the magnitudes of the coupling strengths $|J_{ij}|$ applied to the $i^{th}$ qubit. For example, a first qubit that is coupled to a second qubit by coupling strength $J_{12}=+1$ and to a third qubit by coupling strength $J_{13}=-1$ has a total coupling of $J_{tot}=|+1|+|-1|=2$.

At 902, the quantum processor is initialized by, for example, applying the necessary control signals to establishes the particular combinations of $h_i$ and $J_{ij}$ terms that correspond to the desired problem Hamiltonian. In some embodiments, the initial values of some or all of the $h_i$ and $J_{ij}$ terms may be zero. In some embodiments, the quantum processor, or at least, the initialization of the quantum processor, may be used in the analysis of the problem Hamiltonian 901. In such embodiments, it may be preferred to perform the initialization 902 before the analysis 901.

At 903, the quantum processor is evolved by applying disordering signals to induce inhomogeneous tunneling amplitudes $\Delta_i$ in the qubits in the quantum processor. The applied disordering signals may be programmed so that the tunneling amplitude that is induced in any particular qubit may depend on the total coupling that is applied to that qubit. For example, the tunneling amplitude $\Delta_i$ that is induced in the $i^{th}$ qubit may be proportional to the total coupling $J_{tot}$ applied to that qubit:

$$\Delta_i \propto \sum_j |J_{ij}|$$

In this way, qubits that are particularly strongly coupled to other qubits encounter a higher tunneling amplitude than qubits that are less strongly coupled to other qubits. As previously described, a qubit that is particularly strongly coupled to other qubits, or a set of particularly strongly inter-coupled qubits, may be more likely to contribute a local minimum to the problem Hamiltonian. Hence, certain qubits may be predicted to contribute a local minimum to a problem Hamiltonian, if those qubits are considered likely to influence the system behavior around particular local minima according to any of a variety of criteria. Thus, inducing higher tunneling amplitudes in such qubits may improve the chances of escaping from and/or avoiding such a local minimum during the evolution of the quantum processor. The evolution of the inhomogeneous tunneling amplitudes constitutes, at least in part, the quantum computation. This evolution may, therefore, be an implementation of quantum annealing and/or adiabatic quantum computation. At 904, the evolution is complete and the state of at least one qubit may be read out from the quantum processor.

Returning to FIG. 1, in portion of a conventional superconducting quantum processor 100 each of programming interfaces 121-125 may be controlled by a separate signal line. However, as a superconducting quantum processor scales upwards to include more and more devices (e.g., qubits and couplers) the number of signal lines required to control the programming interfaces can become impractical and unmanageable. The number of signal lines that are required to control the various elements of a superconducting quantum processor may be regulated by implementing local programming of the elements of the quantum processor, as described in US Patent Publication 2008-0215850. Locally programming the elements of a superconducting quantum processor may involve the use of superconducting digital-to-analog converters ("DACs"), such as those described in US Patent Publication 2009-0082209. In some embodiments, at least one DAC may be communicatively coupled to at least one demultiplexer circuit such as those described in U.S. Provisional Patent Application Ser. No. 61/058,494, filed Jun. 3, 2008, entitled "Systems, Methods and Apparatus For Superconducting Demultiplexer Circuits." In some embodiments, at least one DAC may be communicatively coupled to at least one superconducting shift register, such as a single flux quantum shift register or a shift register comprising latching qubits as described in U.S. patent application Ser. No. 12/109,847. For example, in an embodiment of a superconducting quantum processor that employs local programming, each of programming interfaces 121-125 from FIG. 1 may include a respective DAC.

In order to apply disordering signals to induce inhomogeneous tunneling amplitudes in the qubits of a superconducting quantum processor, it may be necessary to provide a structure to independently vary the tunneling amplitude that is induced in each qubit. This may be achieved, for example, by using a unique signal line to apply a unique disordering signal to each qubit. That is, programming interface 121 may apply a first disordering signal to qubit 101 and thereby induce a first tunneling amplitude in qubit 101. Similarly, programming interface 124 may apply a second disordering signal to qubit 102 and thereby induce a second tunneling amplitude in qubit 102. In order to enable independent control of the first and second disordering signals, each of programming interfaces 121 and 124 may be controlled by a separate signal line. However, as previously described, implementing qubit-specific signal lines can lead to an impractical and unmanageable number of signal lines as the size of the quantum processor increases. Thus, in some embodiments it is preferable to induce inhomogeneous tunneling amplitudes in the qubits of a superconducting quantum processor by implementing scalable programming devices and methods. An example of an appropriate scalable programming device is the multiplier coupled to a global signal line as described in PCT Patent Application Serial No. PCT/US2009/044537.

The various methods described herein (e.g., methods 700, 800, and 900 fro FIGS. 7-9) provide techniques for improving adiabatic quantum computation and/or quantum annealing by making specific adaptations to the initial Hamiltonian. In the known art, a conventional initial Hamiltonian consists of substantially homogeneous off-diagonal terms. Conversely, in method 700 the conventional initial Hamiltonian is adapted to include diagonal terms and in methods 800 and 900 the conventional initial Hamiltonian is adapted to include inhomogeneous off-diagonal terms. Thus, these techniques represent specific embodiments of a more general method of configuring an initial Hamiltonian such that local minima are avoided when a quantum processor is evolved from the initial Hamiltonian to a problem Hamiltonian.

Figure 10:
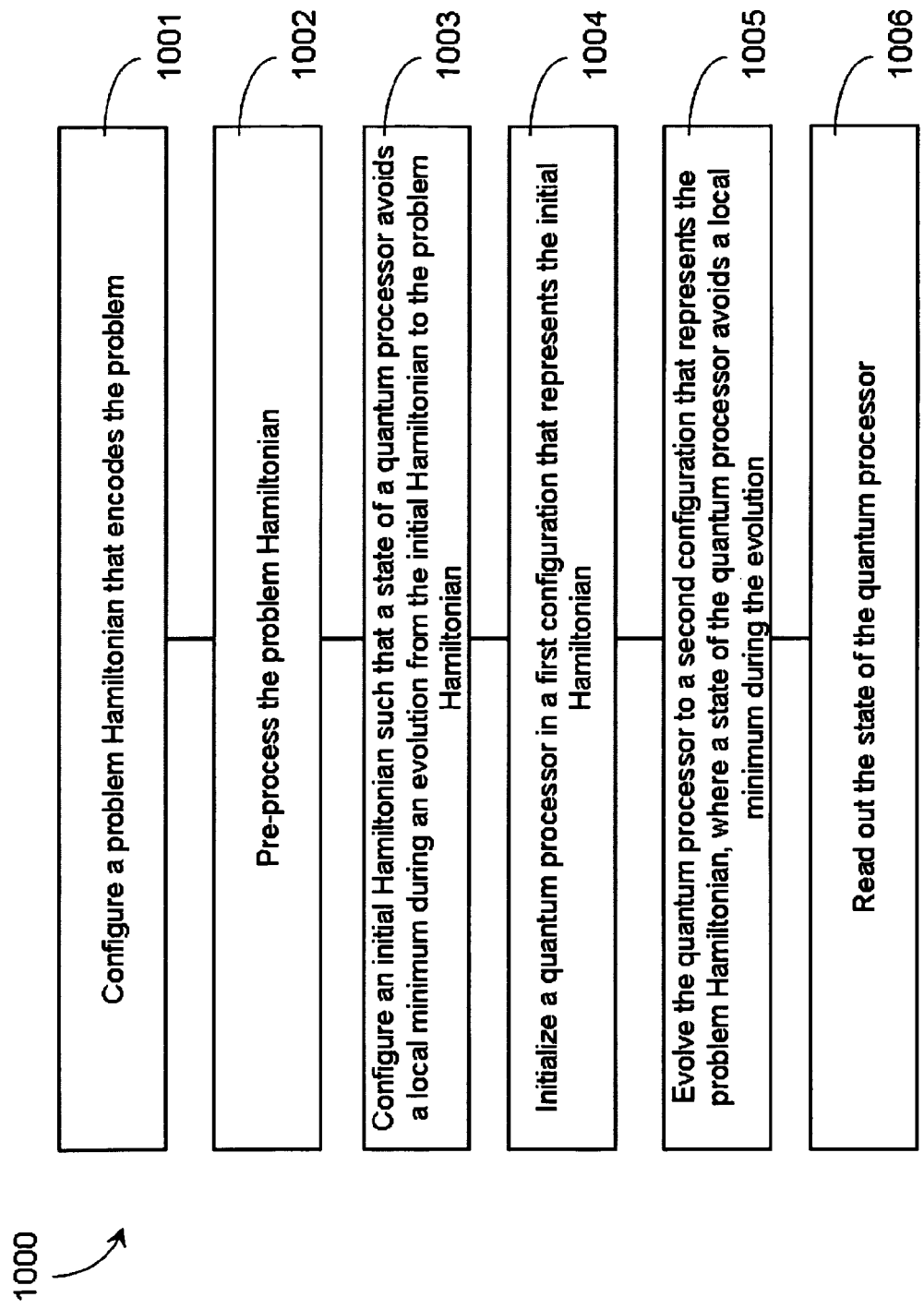
FIG. 10 is a flow diagram of an embodiment of a method for using an adapted initial Hamiltonian to avoid local minima while solving a problem by adiabatic quantum computation and/or quantum annealing.

FIG. 10 is a flow diagram of an embodiment of a method 1000 for using an adapted initial Hamiltonian to avoid local minima while solving a problem by adiabatic quantum computation and/or quantum annealing. Method 1000 comprises six acts 1001-1006, though other acts may be included at any stage of method 1000 and acts 1001-1006 need not necessarily be performed in the order depicted in FIG. 10. At 1001, a problem Hamiltonian that encodes the problem is configured. For example, the problem may be encoded in a problem Hamiltonian that is substantially in the form of equation 3. In some embodiments, this configuring may be achieved using a classical digital computer. At 1002, the problem Hamiltonian is pre-processed. In some embodiments, this pre-processing may be achieved using a processor system such as a classical digital computer. In some embodiments, pre-processing the problem Hamiltonian may involve establishing at least one center point for a ball and/or establishing a set of balls that cover the computation space described by the problem Hamiltonian. In other embodiments, pre-processing the problem Hamiltonian may involve analyzing the problem Hamiltonian to determine a set of qubits that are likely to contribute a local minimum to the problem Hamiltonian. At 1003, an initial Hamiltonian is configured such that a state of a quantum processor avoids at least one local minimum during an evolution from the initial Hamiltonian to the problem Hamiltonian. The configuration of the initial Hamiltonian may be based on a result from the pre-processing of the problem Hamiltonian. For instance, if the problem Hamiltonian is pre-processed to determine a center point for a ball and/or to establish a set of balls that cover the computation space described by the problem Hamiltonian, then the initial Hamiltonian may be configured as a mixed initial Hamiltonian with diagonal and off-diagonal terms in accordance with method 700 from FIG. 7. Alternatively, if the problem Hamiltonian is pre-processed to determine a set of qubits that are likely to contribute a local minimum to the problem Hamiltonian, then the initial Hamiltonian may be configured to include inhomogeneous off-diagonal terms in accordance with methods 800 and 900 from FIGS. 8 and 9, respectively.

In 1004, a quantum processor is initialized in a first configuration that represents the initial Hamiltonian from 1003. In some embodiments, the quantum processor may include a superconducting quantum processor comprising, for example, superconducting flux qubits. In 1005, the quantum processor is evolved to a second configuration that represents the problem Hamiltonian, where the state of the quantum processor avoids at least one local minimum during the evolution. In some embodiments, the evolution may embody an implementation of adiabatic quantum computation and/or quantum annealing. In 1006, a state of the quantum processor is read out to provide a solution to the problem.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other systems and methods of adiabatic quantum computation, not necessarily the exemplary systems and methods of adiabatic quantum computation generally described above.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, including but not limited to U.S. Provisional Patent Application Ser. No. 61/056,781, filed May 28, 2008 and entitled "Systems, Methods and Apparatus for Adiabatic Quantum Computation"; U.S. Provisional Patent Application Ser. No. 61/092,665, filed Aug. 28, 2008 and entitled "Systems, Methods and Apparatus to Avoid Local Minima in Quantum Computation"; US Patent Publication No. 2006-0225165; US Patent Publication 2008-0176750; U.S. patent application Ser. No. 12/266,378; PCT Patent Application Serial No. PCT/US09/37984; U.S. Pat. No. 7,135,701; US Patent Publication 2008-0162613; US Patent Publication 2008-0215850; US Patent Publication 2009-0082209; U.S. Provisional Patent Application Ser. No. 61/058,494, filed Jun. 3, 2008, entitled "Systems, Methods and Apparatus For Superconducting Demultiplexer Circuits"; and PCT Patent Application Serial No. PCT/US2009/044537, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of quantum computing using a quantum system comprising a plurality of qubits, the method comprising:
   initializing the quantum system in a first configuration, wherein the first configuration represents a mixed initial Hamiltonian that includes both diagonal and off-diagonal terms, and wherein the diagonal terms at least partially define a center point of a first computation space that is at least partially contained within a second computation space, wherein the second computation space is larger than the first computation space;
   evolving the quantum system to a second configuration, wherein the second configuration represents a final Hamiltonian that includes diagonal terms, and wherein a state of the quantum system remains within the first computation space throughout the evolution; and
   reading out the state of the quantum system.

2. The method of claim 1 wherein initializing the quantum system in a first configuration includes initializing the quantum system in a ground state of the mixed initial Hamiltonian.

3. The method of claim 2 wherein evolving the quantum system includes evolving the quantum system such that at least a portion of the evolution is adiabatically evolved thereby achieving an adiabatic evolution.

4. The method of claim 3 wherein evolving the quantum system includes evolving the quantum system such that the quantum system remains in a ground state throughout the evolution and the state of the quantum system that is read out is a ground state of the final Hamiltonian.

5. The method of claim 1 wherein a state of the final Hamiltonian encodes a solution to a problem.

6. The method of claim 1 wherein initializing the quantum system includes programming the diagonal terms of the mixed initial Hamiltonian by assigning an initial value to each qubit.

7. The method of claim 1, further comprising repeating the initializing the quantum system, evolving the quantum system, and reading out the state of the quantum system in a plurality of iterations.

8. The method of claim 7 wherein at least one iteration involves initializing the quantum system with a center point that is different from a center point in at least one other iteration.

9. The method of claim 8 wherein each iteration includes evolving within a unique first computation space, thereby defining a set of first computation spaces.

10. The method of claim 9 wherein the set of first computation spaces covers the second computation space.

11. The method of claim 10, further comprising:
    preprocessing at least a portion of the second computation space to generate the set of first computation spaces such that the set of first computation spaces covers the second computation space.

12. The method of claim 11 wherein preprocessing includes generating the set of first computation spaces via at least one of: a covering code technique, a vertex coloring technique, and establishing a random set of center points.

13. A processor system, comprising:
a superconducting quantum processor comprising a plurality of qubits and at least one coupler between at least some respective pairs of qubits;
an operational subsystem including a plurality of programming interfaces operable to program the qubits, the operational subsystem configured to initialize the superconducting quantum processor in a first configuration, wherein the first configuration describes a mixed initial Hamiltonian that includes both diagonal and off-diagonal terms, and wherein the diagonal terms at least partially define a center point of a first computation space that is at least partially contained within a second computation space, wherein the second computation space is larger than the first computation space; and
a read out subsystem configured to read out a state of the superconducting quantum processor after an evolution of the superconducting quantum processor to a second configuration, wherein the second configuration is described by a final Hamiltonian that includes diagonal, and wherein the state of the superconducting quantum processor remains within the first computation space throughout the evolution.

14. The processor system of claim 13 wherein the operational subsystem is further configured to iteratively repeatedly initialize the superconducting quantum processor with a unique center point during each iteration.

15. The processor system of claim 14 wherein the read out subsystem is further configured to read out a respective state of the superconducting quantum processor during each iteration.

* * * * *